US007103614B1

(12) United States Patent
Kucik

(10) Patent No.: US 7,103,614 B1
(45) Date of Patent: Sep. 5, 2006

(54) AUTOMATIC VEHICLE INFORMATION RETRIEVAL FOR USE AT ENTRY TO A SECURE SITE

(75) Inventor: Daniel P. Kucik, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 473 days.

(21) Appl. No.: 10/154,468

(22) Filed: May 24, 2002

(51) Int. Cl.
*G06F 7/00* (2006.01)
*G06F 17/00* (2006.01)

(52) U.S. Cl. .................................... 707/104.1; 340/933

(58) Field of Classification Search ................ 340/933, 340/932.3; 382/104; 702/159; 707/104.1
See application file for complete search history.

(56) References Cited

U.S. PATENT DOCUMENTS 5,381,155 A * 1/1995 Gerber ....................... 342/104
5,568,406 A * 10/1996 Gerber ....................... 702/159
6,121,898 A * 9/2000 Moetteli ..................... 340/933
6,340,935 B1 * 1/2002 Hall ........................ 340/932.2
2002/0141618 A1 * 10/2002 Ciolli et al. ................ 382/104

* cited by examiner

*Primary Examiner*—Sam Rimell
(74) *Attorney, Agent, or Firm*—James T. Shepherd

(57) ABSTRACT

A method and system are provided for automatically retrieving information associated with vehicles that must sequentially pass an entrance to a secure site. Prior to the entrance to the secure site, a plurality of vehicles can be aligned in a queue having a front end located at the secure site's entrance. When a vehicle enters the queue, identifying indicia on the vehicle's license tag is automatically transmitted to one or more remotely-located databases in order to retrieve information associated with the license tag. When the vehicle reaches the front of the queue, the information so-retrieved is automatically made available in a human recognizable format to security personnel at the secure site's entrance.

11 Claims, 2 Drawing Sheets

AUTOMATIC VEHICLE INFORMATION RETRIEVAL FOR USE AT ENTRY TO A SECURE SITE

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to methods and systems for improving security at secure sites, and more particularly to a method and system for automatically retrieving information associated with a vehicle's license tag just prior to the entrance of the vehicle onto the secure site.

BACKGROUND OF THE INVENTION

One of the greatest challenges in the struggle against terrorist activities is to maintain a high level of security in high-risk facilities such as military bases, government installations, research laboratories, ports, airports, etc. Typically, such facilities have specified entrances manned by trained security personnel.

Currently, if a security officer requires information on an individual or their car, the officer must either make the request over the radio and wait for the dispatcher to research the information or the officer must manually enter the request into a computer. Either approach requires too much time to allow the officer to pull-up the information on all vehicles entering a facility while still maintaining a steady flow of traffic. Furthermore, if an officer wants information contained in the National Crime Investigation Center (NCIC) or similar law-enforcement database in addition to the information contained in the site's vehicle or personnel database, the officer must perform multiple data searches, i.e., one for each database of interest.

SUMMARY OF THE INVENTION

Accordingly, it is an object of the present invention to provide a method and system for automatically retrieving vehicle information as a vehicle approaches a secure site having a restricted entrance.

Another object of the present invention is to provide a method and system for automatically retrieving vehicle information as vehicles queue up to enter a secure site where the information is retrieved when a vehicle enters the queue and is made available to security personnel when the vehicle reaches the front of the queue.

Other objects and advantages of the present invention will become more obvious hereinafter in the specification and drawings.

In accordance with the present invention, a method and system are provided for automatically retrieving vehicle information maintained at remotely-located databases. The retrieved information is associated with vehicles that must sequentially pass an entrance to a secure site. Prior to the entrance to the secure site, a plurality of vehicles can be aligned in a queue having a front end located at the entrance. The presence of a vehicle entering the back end of the queue is detected and a signal indicative thereof is generated. It is assumed that the vehicle has a license tag coupled thereto.

A camera is positioned to capture an image of the license tag in response to generation of the signal indicating that the vehicle has entered the back of the queue. A controller coupled to the camera automatically accesses one or more of the remotely-located databases to retrieve information stored thereat that is associated with the license tag in the image. A trigger signal is generated automatically when the vehicle reaches the front of the queue. One or more devices located at the secure site make the information so-retrieved available in a human recognizable format in response to generation of the trigger signal.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
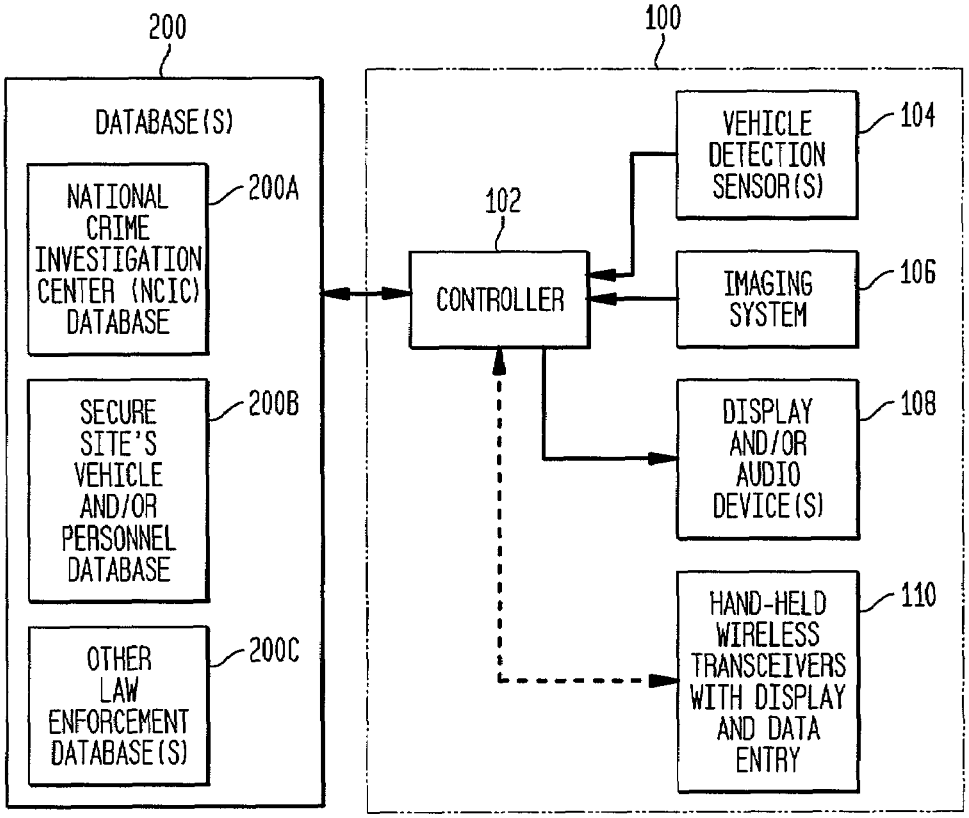
FIG. 1 is a functional block diagram of the system in accordance with the present invention for automatically retrieving information associated with a vehicle where the information is maintained at remotely-located databases.

Referring now to the drawings, and more particularly to FIG. 1, a block diagram of the system for automatically retrieving information associated with a licensed vehicle in accordance with the present invention is shown and is referenced generally by numeral 100. The information is maintained at one or more databases 200 capable of being accessed electronically by authorized personnel, organizations or systems.

Figure 2:
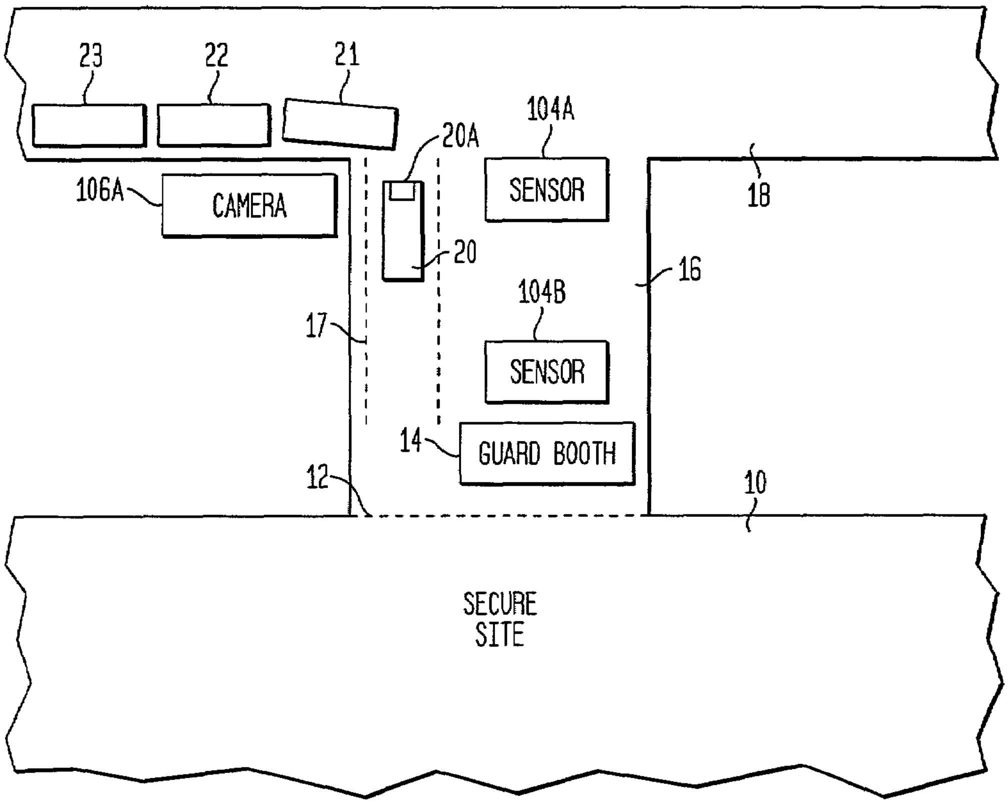
FIG. 2 is a schematic view of a typical entrance scenario to a secure site illustrating possible positions of sensing and imaging devices used in the present invention.

While the automatic retrieval aspects of the present invention can be utilized in a variety of security-based applications, the particular application contemplated by the present invention is illustrated schematically in FIG. 2. Specifically, a secure site 10 has a restricted entrance 12 secured by personnel (not shown) stationed at a guard booth or house 14. Entrance 12 is approached by incoming vehicles 20, 21, 22 and 23 along an entrance road 16 that is accessed via a public road 18. In order to control the flow of incoming vehicles, entrance road 16 is generally configured (e.g., lined, defined by cones or barricades, etc.) to align vehicles 20, 21, 22 and 23 sequentially in a single-file queue 17 defined along entrance road 16.

Referring again to FIG. 1, operation of system 100 is controlled by a controller 102 (e.g., personal computer to include data input and output devices). Typically, controller 102 will be located at guard booth 14. Coupled to controller 102 are one or more vehicle detection sensors 104, an imaging system 106 (e.g., camera or other optical recognition system), display and/or audio output devices 108 (e.g., display terminals, synthesized voice outputs, audio alarms, etc.) and, optionally, hand-held wireless transceivers 110 having display and data entry capability (e.g., personal digital assistants or PDA's).

An operation description of system 100 in accordance with the present invention will make simultaneous reference to FIGS. 1 and 2. As vehicle 20 turns onto entrance road 16 and into queue 17, a sensor 104A (i.e., represented by sensor(s) 104 in FIG. 1) detects its presence and provides a signal indicative thereof to controller 102. In response to generation of this signal, controller 102 instructs imaging system 106 (e.g., a high-resolution camera 106A in FIG. 2) to capture an image that will include a license tag 20A on vehicle 20. Note that not all states require a license tag on the front of vehicles while all states do require a license tag on the rear of vehicles thereby making it most efficient to have camera 106A positioned to capture an image of the back of vehicle 20. The critical portion of the captured image is license tag 20A.

The captured image to include that of license tag 20A is processed (either as part of imaging system 106 or part of controller 102) to extract the license tag's unique letter and/or number identification. This can be achieved by any of a variety of well known optical character recognition schemes. As a result, an electronic "image" (e.g., a digital American Standard Code for Information Interchange (ASCII) character string) of the identifying indica on license tag 20A can be formed. Controller 102 accesses (e.g., via phone lines, cable lines, the air waves or other transmission media) databases 200 and transmits the electronic image of license tag 20A thereto. The accessed databases 200 can include the National Crime Investigation Center (NCIC) database 200A, database 200B maintained at secure site 10 for personnel and/or vehicles frequenting secure site 10, and other national, state or local law enforcement databases 200C.

The accessed databases 200 return information associated with license tag 20A such as vehicle model/make/year, registered owner of the vehicle that license tag 20A is assigned to, if the vehicle has been reported stolen, if the license tag has been reported stolen, if the registered owner is wanted by law enforcement, etc. The retrieved information is presented to security personnel at guard booth 14 by means of display and/or audio devices 108 coupled to controller 102. Additionally, the information can be wirelessly transmitted to one or more hand-held units 110 maintained by additional security personnel stationed around secure site 10. In this way, should a suspect vehicle get past guard booth 14, other on-site security personnel would already be aware of the information known by personnel at guard booth 14.

As mentioned above in the "Background", security at entrance 12 must be maintained while providing for a steady flow of traffic into secure site 10 for efficient entry processing of authorized personnel and their vehicles. Accordingly, it is preferred to capture the image of license tag 20A as vehicle 20 first enters queue 17 defined along entrance road 16. Then, the retrieved information from databases 200 can be correspondingly queued by controller 102. When vehicle 20 approaches guard booth 14, the information queue maintained by controller 102 can be toggled manually or, preferably, automatically to display the next set of retrieved information in the queue. Such manual toggling can be achieved by security personnel at guard booth 14 while an automatic arrangement for toggling could be achieved by positioning another vehicle detection sensor 104B at the front of queue 17 located at guard booth 14. Operationally, sensor 104B is positioned to detect when vehicle 20 has reached the front of queue 17. Note that the distance between sensor 104A and 104B can be set to accommodate the time delay in accessing database 200 and receiving information therefrom. In this way, traffic will generally flow smoothly onto secure site 10 as the information relating to license tag 20A will be output for personnel at guard booth 14 as soon as sensor 104B is triggered.

The advantages of the present invention are numerous. Information traceable from a vehicle's license tag is automatically retrieved from one or more remotely-located databases so that security personnel can review detailed information about each vehicle entering a secure site. An efficient traffic flow can be maintained as the system and method can be configured to automatically toggle through the retrieved information in correspondence with the sequential order of vehicles passing through the system.

Although the invention has been described relative to a specific embodiment thereof, there are numerous variations and modifications that will be readily apparent to those skilled in the art in light of the above teachings. For example, security personnel at the secure site could also initiate a search based on whatever search criteria they desire (e.g., an individual's name, a license plate number, a vehicle identification number, etc.) in addition to the automatic license plate imaging approach described above. Search criteria could be entered manually at either controller 102 or wireless transceiver 110. This will allow security personnel to perform searches on people outside of their vehicles or in suspicious vehicles parked within the secure site without the need for imaging the license plate. This will also reduce/eliminate the need for roving security personnel to call a central dispatch to initiate a search of multiple databases. The system can be programmed such that this function is carried out in parallel with the operations taking place at the entrance to the secure site. It is therefore to be understood that, within the scope of the appended claims, the invention may be practiced other than as specifically described.

The invention claimed is:

1. A system for automatically retrieving vehicle information maintained at remotely-located databases for vehicles that must sequentially pass an entrance to a secure site wherein a plurality of vehicles are aligned in a queue leading up to the secure site with the queue having a front end located at the entrance and having a back end located a distance away from the entrance, said system comprising:

sensing means for detecting the presence of each vehicle entering the back end of the queue and for generating a signal indicative thereof, wherein each vehicle has a license tag coupled thereto;

a camera coupled to said sensing means and positioned to capture an image of each license tag in response to generation of said signal;

a controller coupled to said camera for automatically accessing one or more of the remotely-located databases to retrieve information stored thereat that is associated with each license tag, said controller ordering said information so-retrieved to correspond to the order of the plurality of vehicles in the queue;

triggering means for generating a trigger signal when the each vehicle reaches the front of the queue, said sensing means and said triggering means separated by a distance to accommodate the time that it takes for said controller to retrieve said information as each vehicle travels from the back end of the queue to the front end of the queue; and at least one device located at the secure site and coupled to said triggering means for making said information so-retrieved for each vehicle available in a human recognizable format in response to generation of said trigger signal wherein said information so-retrieved and made available corresponds to the vehicle at the front end of the queue.

2. A system as in claim 1 wherein said triggering means comprises a sensor positioned to detect the presence of each vehicle as it reaches the front of the queue.

3. A system as in claim 1 wherein said at least one device comprises at least one display device.

4. A system as in claim 1 wherein said at least one device comprises at least one audio device.

5. A system as in claim 1 wherein said at least one device comprises at least one display device and at least one audio device.

6. A system as in claim 1 wherein said controller includes a wireless transceiver for wirelessly transmitting said information so-retrieved, and wherein said at least one device includes at least one hand-held wireless receiver for wirelessly receiving said information transmitted by said wireless transceiver.

7. A method for automatically retrieving vehicle information maintained at remotely-located databases for vehicles that must sequentially pass an entrance to a secure site wherein a plurality of vehicles can be aligned in a queue leading up to the secure site with the queue having a front end located at the entrance and having a back end located a distance away from the entrance, said method comprising the steps of:

detecting the presence of each vehicle entering the back end of the queue and generating a signal indicative thereof, wherein each vehicle has a license tag with identifying indicia thereon;

forming an electronic image of the identifying indicia for each vehicle in response to generation of said signal;

automatically submitting said electronic image to one or more of the remotely-located databases, wherein information stored thereat that is associated with the identifying indicia is accessed during the time it takes for each vehicle to travel from the back end to the front end of the queue;

ordering said information so-accessed to form ordered information that corresponds to the order of the plurality of vehicles in the queue;

generating a trigger signal when each vehicle reaches the front end of the queue; and making said ordered information for each vehicle available at the entrance of the secure site in a human recognizable format in response to said trigger signal wherein said ordered information made available corresponds to the vehicle at the front end of the queue.

8. A method according to claim 7 wherein said step of making comprises the step of displaying said ordered information in a visual format.

9. A method according to claim 7 wherein said step of making comprises the step of playing said ordered information in an audio format.

10. A method according to claim 7 wherein said step of making comprises the steps of:

displaying said ordered information in a visual format; and playing said ordered information in an audio format.

11. A method according to claim 7 further comprising the step of wirelessly transmitting said ordered information from the entrance of the secure site.

* * * * *